(No Model.)

T. B. DYSART.
SPROCKET GEARING.

No. 537,185. Patented Apr. 9, 1895.

Witnesses
C. B. McConnell
H. F. Benson

Inventor
Thomas B. Dysart

UNITED STATES PATENT OFFICE.

THOMAS B. DYSART, OF SUPERIOR, NEBRASKA.

SPROCKET-GEARING.

SPECIFICATION forming part of Letters Patent No. 537,185, dated April 9, 1895.

Application filed October 23, 1894. Serial No. 526,782. (No model.)

*To all whom it may concern:*

Be it known that I, THOMAS B. DYSART, a citizen of the United States, residing at Superior, county of Nuckolls, and State of Nebraska, have invented a new and useful Sprocket-Gearing, of which the following is a specification.

My invention relates to an improvement in sprocket gearing and the object of my invention is to provide a sprocket chain and chain wheel of simple and durable construction. I attain this object by the mechanism illustrated in the accompanying drawings, in which—

Figure 1:
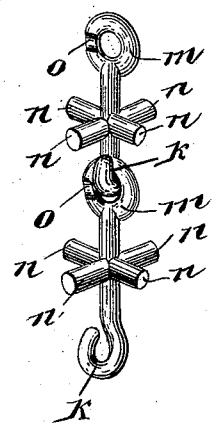
Figure 2:
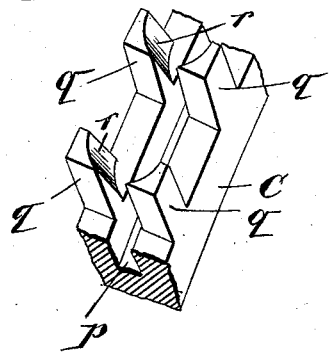
Figure 3:
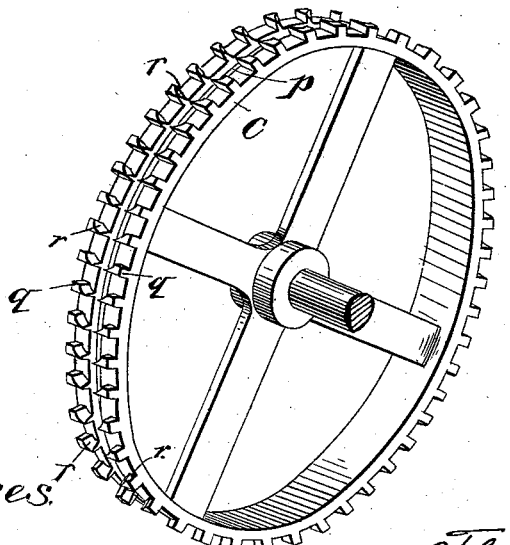

Figure 1 is the sprocket chain. Fig. 2 is the sprocket wheel; and Fig. 3 is an enlarged view of a portion of the sprocket wheel rim showing the teeth.

The sprocket chain link is constructed with a hook, "$k$" at one end and an eye, "$m$" at the other end, that portion of the link forming the eye having a flattened portion at one side, "$o$" to permit of the passing over it of the hook of the next link. In the center of the link are two cross-bars "$n$," "$n$" placed at right angles to each other and arranged in the respective planes of the hook and eye.

The sprocket wheel "C" is constructed with a groove "$p$," in the center of the inner rim and a row of teeth, "$q$" oppositely disposed on each side of said groove, said teeth being concave at one of their inner corners, "$r$" for the purpose of affording clearance for the chain joints. The said sprocket chain is carried by said chain wheel between the rows of teeth, one of the cross-bars of the chain link catching on the teeth and the other cross-bar extending into the groove "$p$."

What I claim as my invention, and desire to secure by Letters Patent, is—

1. A sprocket wheel having a groove in the center of its inner rim and a row of teeth being each concaved at one of their inner corners for the purpose of affording clearance for the chain joints.

2. A sprocket chain link constructed with a hook at one end and an eye at the other end that part of the link forming the eye having a flattened portion at one side to permit of the passage over it of the hook of the next link and two cross-bars placed at right angles to each other in the center of the link and arranged in the respective planes of the hook and eye.

THOMAS B. DYSART.

Witnesses:
 W. F. BUCK,
 C. B. MCCONNELL.